US007226975B2

(12) United States Patent
Voorheis et al.

(10) Patent No.: US 7,226,975 B2
(45) Date of Patent: Jun. 5, 2007

(54) GOLF BALL CORE COMPOSITIONS

(75) Inventors: Peter R. Voorheis, New Bedford, MA (US); Samuel A. Pasqua, Jr., Tiverton, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/843,588

(22) Filed: May 12, 2004

(65) Prior Publication Data

US 2005/0256237 A1 Nov. 17, 2005

(51) Int. Cl.
*A63B 37/00* (2006.01)
*A63B 37/06* (2006.01)
*C08J 3/22* (2006.01)

(52) U.S. Cl. ............... 525/193; 525/263; 525/274; 523/351; 524/394; 524/399; 524/400; 473/371; 473/372

(58) Field of Classification Search .............. None
See application file for complete search history.

(56) References Cited

U.S. PATENT DOCUMENTS

| | | | |
|---|---|---|---|
| 4,305,851 A | 12/1981 | Tominaga et al. | 260/50 |
| 4,560,168 A | 12/1985 | Aoyama | 273/232 |
| 4,925,193 A | 5/1990 | Melvin et al. | 273/232 |
| 4,960,281 A | 10/1990 | Aoyama | 273/232 |
| 5,006,297 A | 4/1991 | Brown et al. | 264/234 |
| 5,093,402 A | 3/1992 | Hashimoto et al. | 524/398 |
| 5,096,943 A | 3/1992 | Hashimoto et al. | 523/333 |
| 5,248,878 A | 9/1993 | Ihara | 219/121.69 |
| 5,249,804 A | 10/1993 | Sanchez | 273/232 |
| 5,334,673 A | 8/1994 | Wu | 273/235 R |
| 5,368,304 A * | 11/1994 | Sullivan et al. | 473/377 |
| 5,484,870 A | 1/1996 | Wu | 528/28 |
| 5,562,552 A | 10/1996 | Thurman | 473/379 |
| 5,575,477 A | 11/1996 | Hwang | 473/379 |
| 5,688,191 A | 11/1997 | Cavallaro et al. | 473/373 |
| 5,713,801 A | 2/1998 | Aoyama | 473/354 |
| 5,733,428 A | 3/1998 | Calabria et al. | 264/134 |
| 5,803,831 A | 9/1998 | Sullivan et al. | 473/374 |
| 5,820,488 A | 10/1998 | Sullivan et al. | 473/374 |
| 5,849,168 A | 12/1998 | Lutz | 264/755 |
| 5,885,172 A | 3/1999 | Hebert et al. | 473/374 |
| 5,919,100 A | 7/1999 | Boehm et al. | 473/354 |
| 5,957,787 A | 9/1999 | Hwang | 473/379 |
| 5,965,669 A | 10/1999 | Cavallaro et al. | 525/221 |
| 5,981,654 A | 11/1999 | Rajagoapalan | 525/66 |
| 5,981,658 A | 11/1999 | Rajagopalan et al. | 525/72 |
| 6,056,842 A | 5/2000 | Dalton et al. | 156/243 |
| 6,075,223 A | 6/2000 | Harrison | 219/121.85 |
| 6,099,415 A | 8/2000 | Lutz | 473/357 |
| 6,129,881 A | 10/2000 | Puniello | 264/278 |
| 6,136,906 A * | 10/2000 | Sano | 524/399 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,194,504 B1 | 2/2001 | Nagel et al. | 524/394 |
| 6,207,784 B1 | 3/2001 | Rajagopalan | 528/71 |
| 6,213,898 B1 | 4/2001 | Ogg | 473/383 |
| 6,218,453 B1 * | 4/2001 | Boehm et al. | 524/433 |
| 6,235,230 B1 | 5/2001 | Puniello | 264/278 |
| 6,241,622 B1 | 6/2001 | Gobush et al. | 473/199 |
| 6,248,804 B1 | 6/2001 | Lutz | 523/160 |
| 6,286,364 B1 | 9/2001 | Aoyama et al. | 73/65.03 |
| 6,290,615 B1 | 9/2001 | Ogg | 473/378 |
| 6,305,851 B1 | 10/2001 | Stummer | 385/88 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,379,138 B1 | 4/2002 | Puniello et al. | 425/116 |
| 6,383,092 B1 | 5/2002 | Ogg | 473/378 |
| 6,409,615 B1 | 6/2002 | McGuire et al. | 473/383 |
| 6,462,303 B1 | 10/2002 | Brown | 219/121.69 |
| 6,488,591 B1 | 12/2002 | Gobush et al. | 473/199 |
| 6,494,795 B2 | 12/2002 | Sullivan | 473/372 |
| 6,500,073 B1 | 12/2002 | Gobush et al. | 473/199 |
| 6,500,495 B2 | 12/2002 | Lutz | 427/500 |
| 2001/0005699 A1 | 6/2001 | Morgan et al. | |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0016224 A1 | 2/2002 | Pasqua et al. | |
| 2002/0025862 A1 | 2/2002 | Sullivan et al. | |
| 2002/0028885 A1 | 3/2002 | Sullivan et al. | |
| 2002/0079615 A1 | 6/2002 | Puniello et al. | |
| 2002/0082358 A1 | 6/2002 | Ohira et al. | |

(Continued)

FOREIGN PATENT DOCUMENTS

JP 63222780 * 9/1988

OTHER PUBLICATIONS

Research Disclosure 386041; "Masterbatch for Use in Golf Balls"; Jun. 1996.*

(Continued)

*Primary Examiner*—David J. Buttner
(74) *Attorney, Agent, or Firm*—Bingham McCutchen LLP

(57) ABSTRACT

Golf ball compositions including novel processing aids, e.g., metal salts of unsaturated fatty acids, high styrene resins, transpolyisoprene, and transpolybutadiene, for inclusion in rubber-based compositions that reduce safety risks, mixer down time, increase dispersion of the ingredients during processing, and increase component COR over that of a component formed with a conventional processing aid.

23 Claims, 3 Drawing Sheets

U.S. PATENT DOCUMENTS

| | | |
|---|---|---|
| 2002/0151380 A1 | 10/2002 | Sullivan |
| 2002/0160859 A1 | 10/2002 | Morgan et al. |
| 2002/0160862 A1 | 10/2002 | Morgan et al. |
| 2003/0078348 A1 | 4/2003 | Rajagopalan et al. |
| 2003/0096936 A1 | 5/2003 | Wu et al. |
| 2003/0106442 A1 | 6/2003 | Gosetti |
| 2003/0114249 A1* | 6/2003 | Voorheis et al. ............ 473/367 |
| 2003/0114255 A1 | 6/2003 | Dalton et al. |
| 2003/0119989 A1 | 6/2003 | Ladd et al. |
| 2003/0125134 A1 | 7/2003 | Nardacci |
| 2003/0158001 A1 | 8/2003 | Morgan et al. |
| 2003/0207999 A1* | 11/2003 | Higuchi et al. ............. 525/274 |
| 2004/0082695 A1* | 4/2004 | Johansson ................... 524/397 |

OTHER PUBLICATIONS

U.S. Appl. No. 10/339,603, filed Jan. 10, 2003 entitled "Polyurethane Compositions for Golf Balls".

U.S. Appl. No. 10/167,744, filed Jun. 13, 2002 entitled "Golf Ball With Multiple Cover Layers".

U.S. Appl. No. 09/717,136, filed Nov. 22, 2000 entitled "Method of Making Golf Balls".

* cited by examiner

GOLF BALL CORE COMPOSITIONS

FIELD OF THE INVENTION

The present invention relates to golf balls. In particular, the golf balls of the invention are formed from, at least in part, novel processing aids that reduce safety risks, mixer down time, and increase dispersion of the ingredients during processing. The compositions of the invention are envisioned for incorporation into any golf ball layer, particularly core layers.

BACKGROUND OF THE INVENTION

Conventional golf balls can be divided into several general classes: (a) solid golf balls having one or more layers, and (b) wound golf balls. Solid golf balls typically include a solid core and at least a cover. Solid cores are generally formed using a rubber-based or elastomeric composition, typically polybutadiene or the like. The polybutadiene core material is usually processed in a two roll mill or Banbury type internal mixer, in combination with additional ingredients in order to provide adequate curing and physical property characteristics. The additional ingredients may include, free radical initiators such as peroxides, cis-to-trans catalysts, crosslinking agents such as metal acrylates, fillers, and the like.

The processability of such a core formulation in a two roll mill or Banbury mixer, however, is affected by certain ingredients. For example, metal acrylates and their interaction with the elastomers and/or the peroxides tend to cause build-up to occur on the rolls, sides of the mixer, and on the rotors. This build-up, if not removed after every batch, generally leads to reduced heat transfer and increased cycle time. Moreover, fragments from the build-up may be mixed into subsequent batches and result in a non-uniform product.

Numerous methods have been attempted to eliminate the zinc acrylate build-up including varying the order of addition of ingredients. For instance, the conventional method of combining the core ingredients is to add most of the ingredients to the elastomer all at once and subsequently add the peroxide. To reduce the build-up from this conventional method, others have attempted to add the metal acrylate first, in order to partially encapsulate the metal acrylate and minimize contact of the metal acrylate with the other ingredients causing the build-up. However, even this order of ingredients only partially reduces the build-up and has a further disadvantage of increasing the cycle time. Another method, disclosed in U.S. Pat. No. 6,194,504, fully encapsulates the metal acrylates by contacting the metal acrylate with a solution of polymer in organic solvent, and then removing the solvent prior to compounding the encapsulated metal acrylate into the elastomeric mixture.

In addition to the build-up, the conventional dry mixing method of combining the core ingredients does not typically provide a very uniform dispersion of the metal acrylate throughout the elastomer.

Furthermore, when transferred, metal acrylates generally produce dust particles having diameters of about 10 microns, which result in odor and inhalation risks for operators. Likewise, certain cis-to-trans catalysts, such as organosulfur compounds, are also dusty in nature.

Thus, there is a need in the art for a core composition with improved processability and dispersion of the ingredients and reduced safety risks. In particular, a there is a need in the art for a core composition that includes particular ingredients in pelleted form with a processing aid to reduce the odor and inhalation problems associated with conventional core compositions and to increase dispersion of the ingredients within the elastomeric composition.

SUMMARY OF THE INVENTION

The present invention is directed to a core composition for a golf ball including a first base rubber; a crosslinker masterbatch including at least one crosslinker, a second base rubber, and at least one processing aid, wherein the processing aid is selected from the group consisting of metal salts of fatty acids, high styrene resins, transpolyisoprene, transpolybutadiene, and mixtures thereof; and a free radical initiator.

In one embodiment, the processing aid is a metal salt of an unsaturated fatty acid. The metal salt may include zinc, magnesium, calcium, aluminum, sodium, lithium, nickel, or mixtures thereof. In another embodiment, the second base rubber includes polybutadiene.

In this aspect of the invention, the crosslinker masterbatch may include about 60 percent to about 90 percent crosslinker, about 10 percent to about 30 percent base rubber, and about 1 percent to about 10 percent processing aid. In one embodiment, the crosslinker masterbatch includes about 75 percent to about 85 percent crosslinker, about 10 percent to about 25 percent base rubber, and about 1 percent to about 5 percent processing aid.

In another embodiment, the crosslinker is present in a blend with a metal salt of an unsaturated fatty acid. In still another embodiment, the crosslinker includes zinc diacrylate, and wherein the processing aid comprises a zinc salt of an unsaturated fatty acid. The processing aid may be selected from the group consisting of zinc stearate, zinc oleate, and mixtures thereof. In addition, the free radical initiator may include a peroxide. The composition may further include at least one of a density-adjusting filler or an antioxidant.

In this aspect of the invention, the cover may include one or more homopolymeric or copolymeric cover materials selected from the group consisting of thermoset polyurethane, thermoplastic polyurethane, thermoset polyurea, thermoplastic polyurea, thermoset elastomer, thermoplastic elastomer and thermoplastic ionomer. In one embodiment, the high styrene resins are selected from the group consisting of styrene-butadiene copolymers, aliphatic hydrocarbon resins, and mixtures thereof.

The present invention is also directed to a composition for golf balls including a base rubber; a crosslinker pellet, wherein the pellet includes at least one crosslinking agent and at least one processing aid comprising a metallic salt of a fatty acid; and a free radical initiator. The pellet may include about 50 percent to about 95 percent of the at least one crosslinking agent and about 50 percent to about 5 percent of the at least one processing aid.

In one embodiment, the metallic salt is selected from the group consisting of magnesium, calcium, zinc, aluminum, sodium, lithium, nickel, and mixtures thereof. In still another embodiment, the fatty acid is oleic acid, stearic acid, or combinations thereof. In this aspect of the invention, the composition may include about 10 pph to about 15 pph of the metallic salt of a fatty acid by weight of the composition.

The crosslinking agent may be selected from the group consisting of zinc acrylate, zinc diacrylate, zinc methacrylate, zinc dimethacrylate, and mixtures thereof.

The present invention further relates to a method of preparing a composition for golf balls including the steps of: providing a crosslinking agent; providing a processing aid including a metallic salt of a fatty acid; blending the crosslinking agent and the processing aid in a mixer at a temperature of about 175° F. to about 250° F. to form a pellet; providing a base rubber; mixing the base rubber and the pellet; and promoting crosslinking between the base rubber and the pellet with a free radical initiator.

The crosslinking agent may be selected from the group consisting of zinc acrylate, zinc diacrylate, zinc methacrylate, zinc dimethacrylate, and mixtures thereof. In one embodiment, the processing aid includes zinc stearate, zinc oleate, or mixtures thereof.

The free radical initiator may include di-t-amyl peroxide, di(2-t-butyl-peroxyisopropyl)benzene peroxide or ,-bis(t-butylperoxy)diisopropylbenzene, 1,1-bis(t-butylperoxy)-3,3,5-trimethylcyclohexane or 1,1-di(t-butylperoxy)3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, or mixtures thereof.

In one embodiment, the step of blending is performed at a temperature of about 200° F. to about 225° F. In another embodiment, the step of blending further includes blending about 50 percent to about 95 percent crosslinking agent with about 50 percent to about 5 percent processing aid.

The invention is also directed to a velocity-improving pastille for golf balls including: a chemical peptizer including at least one sulfur compound; and a physical peptizer including at least one metallic salt of a fatty acid, high styrene resins, transpolyisoprene, transpolybutadiene, and mixtures thereof. The metallic salt may be selected from the group consisting of magnesium, calcium, zinc, aluminum, sodium, lithium, nickel, and mixtures thereof. The fatty acid may be oleic acid, stearic acid, or combinations thereof.

In one embodiment, the sulfur compound includes at least one halogenated organosulfur compound. In another embodiment, the halogenated organosulfur compound has the general formula:

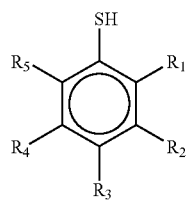

where $R_1$–$R_5$ are selected from the group consisting of $C_1$–$C_8$ alkyl groups; halogen groups; thiol groups (—SH), carboxylated groups; sulfonated groups; hydrogen; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothliophenoland; metal salts thereof; and mixtures thereof. For example, the halogenated organosulfur compound may be zinc pentachlorothiophenol. The sulfur compound may be selected from the group consisting of diphenyl disulfide; 4,4'-ditolyl disulfide; dibenzamino disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl) disulfide; 2,2'-bis(4-aminonaphthyl)disulfide; 2,2'-bis(5-aminonaphthyl)disulfide; 2,2'-bis(6-aminonaphthyl) disulfide; 2,2'-bis(7-aminonaphthyl)disulfide; 2,2'-bis(8-aminonaphthyl)disulfide; 1,1'-bis(2-aminonaphthyl) disulfide; 1,1'-bis(3-aminonaphthyl)disulfide; 1,1'-bis(3-aminonaphthyl)disulfide; 1,1'-bis(4-aminonaphthyl) disulfide; 1,1'-bis(5-aminonaphthyl)disulfide; 1,1'-bis(6-aminonaphthyl)disulfide; 1,1'-bis(7-aminonaphthyl) disulfide; 1,1,-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis (3,5-dichlorophenyl)disulfide; bis(2,4-dichlorophenyl) disulfide; bis(2,6-dichlorophenyl)disulfide; bis(2,5-dibromophenyl) di sulfide; bis(3,5-dibromophenyl) disulfide; bis(2-chloro-5-bromophenyl)disulfide; bis(2,4,6-trichlorophenyl)disulfide; bis(2,3,4,5,6-pentachlorophenyl) disulfide; bis(4-cyanophenyl)disulfide; bis(2-cyanophenyl) disulfide; bis(4-nitrophenyl)disulfide; bis(2-nitrophenyl) disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl) disulfide; 2,2'-bis(1-cyanonaptyl)disulfide; 2,2'-bis(1-acetylnaphthyl)disulfide; and mixtures thereof.

In one embodiment, the pastille includes about 50 weight percent to about 95 weight percent of the chemical peptizer and about 50 weight percent to about 5 weight percent of physical peptizer. In another embodiment, the pastille includes about 70 weight percent to about 80 weight percent of the chemical peptizer and about 11 weight percent to about 13 weight percent of the physical peptizer. The pastille may further include a base rubber present in an amount of about 12 percent to about 15 percent by weight of the pastille.

The present invention also relates to a golf ball including a core and a cover, wherein the core includes a velocity-improving pastille including: a chemical peptizer including at least one sulfur compound; and a physical peptizer including at least one metallic salt of a fatty acid. In one embodiment, the physical peptizer includes zinc stearate, zinc oleate, or mixtures thereof. In another embodiment, the chemical peptizer is selected from the group consisting of zinc pentachlorothiophenol, dibenzaminodisulfide, and mixtures thereof.

The core composition may further include a base rubber, at least one crosslinking agent, and at least one free radical initiator. In one embodiment, the core composition further includes a least one of an antioxidant and a density-adjusting filler.

The pastille may include about 50 percent to about 95 percent of the chemical peptizer and about 50 percent to about 5 percent of the physical peptizer.

The present invention is further directed to a method of preparing a velocity-improving pastille for golf balls including the steps of: providing a chemical peptizer including at least one sulfur compound; providing a physical peptizer including at least one metallic salt of a fatty acid; blending the chemical peptizer and physical peptizer in a mixer at a temperature of about 175° F. to about 250° F. to form a pellet.

In one embodiment, the at least one sulfur compound is selected from the group consisting of diphenyl disulfide; 4,4'-ditolyl disulfide; dibenzamino disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl)disulfide; 1,1'-dinaphthyl disulfide; 2,2'-15 dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphtyl)disulfide; 2,2'-bis(1-acetylnaphthyl)disulfide; and mixtures thereof.

In another embodiment, the at least one sulfur compound is a zinc salt of:

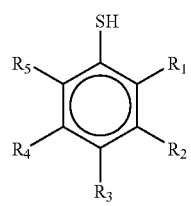

where $R_1$–$R_5$ is selected from the group consisting of $C_1$–$C_8$ alkyl groups; halogen groups; thiol groups (—SH), carboxylated groups; sulfonated groups; hydrogen; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; metal salts thereof; and mixtures thereof.

In this aspect of the invention, the physical peptizer may include zinc stearate, zinc oleate, or mixtures thereof.

In one embodiment, the step of blending is performed at a temperature of about 200° F. to about 225° F. In another embodiment, the step of blending further includes blending about 50 percent to about 95 percent chemical peptizer with about 50 percent to about 5 percent physical peptizer.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
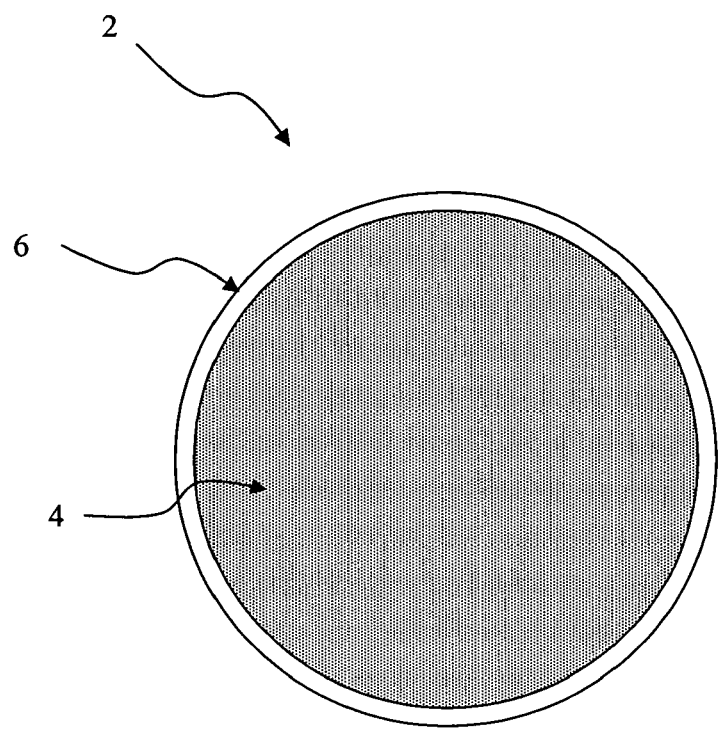
FIG. 1 is a cross-sectional view of a two layer ball, wherein at least a portion of the golf ball is formed from the compositions of the invention.

The present invention relates to an improved composition for use in golf balls. In particular, the present invention relates to a core composition including novel processing aids to increase dispersion, increase processing safety, and decrease the negative effects on core properties that typically result from use of conventional core ingredients.

The compositions of the present invention may be used in any type of golf ball, e.g., one-piece balls, two-piece balls, and multilayer balls. And, while the disclosure is primarily focused on the use of the composition and the components thereof in the core of a golf ball, the improved composition is contemplated for use in any layer of a golf ball.

Compositions of the Invention

As briefly discussed above, the present invention is focused primarily on novel processing aids that increase dispersion, decrease safety risks during processing, and reduce the negative effects that conventional processing aids have on the properties of the composition once incorporated into a golf ball component. Suitable compositions useful to such objectives according to the present invention include compositions having a base (unvulcanized) rubber, such as compositions based on polybutadiene, including those based on polybutadiene mixed with other elastomers. One representative composition of the invention preferably contains a base rubber, at least one crosslinking agent dispersed in a novel carrier/processing aid, a free radical initiator to promote crosslinking of the crosslinking agent and the base rubber, and a filler to control the specific gravity.

In an alternate embodiment, the crosslinking agent is a part of a crosslinker masterbatch that includes a processing aid to improve the masterbatch release from the mixer, aid in extrusion of pellets, and avoid pellet compaction in bulk containers.

The present invention also relates to velocity improving pastilles that include at least one sulfur compound and at least one of the processing aids of the invention.

Base Rubber

The base rubber preferably has a relatively high molecular weight, e.g., about 100,000 to about 500,000, more preferably about 200,000 to about 500,000. As used herein, the term "molecular weight" is defined as the absolute weight average molecular weight. In one embodiment, the base rubber molecular weight is greater than about 250,000, and more preferably from about 300,000 to 500,000. In another embodiment, the base rubber molecular weight is about 400,000 or greater and the polydispersity is no greater than about 2.

In addition, the base rubber preferably has a high-Mooney-viscosity. In one embodiment, the base rubber has a Mooney viscosity greater than about 20, preferably greater than about 30, and more preferably greater than about 40. Mooney viscosity is typically measured according to ASTM D-1646. In one embodiment, the Mooney viscosity of the base rubber is about 50 or greater. In another embodiment, the base rubber has a Mooney viscosity of about 40 to about 80. In still another embodiment, the Mooney viscosity is from about 45 to about 60, more preferably from about 45 to about 55.

In one embodiment, the base rubber is 1,4-polybutadiene, preferably having a cis-isomer content of about 40 percent or greater. As used herein, unless otherwise stated, the percent of cis-isomer polybutadiene, reflects the amount of cis-isomer compared to the total number of polybutadiene isomers. The fraction is multiplied by 100 to obtain the percent. The percent of trans-isomer and vinyl-isomer, discussed below, is similarly defined. In one embodiment, the cis-isomer is present in an amount of greater than about 70 percent of the total polybutadiene content, preferably greater than about 80 percent of the total polybutadiene content, and more preferably greater than about 90 percent of the total polybutadiene content. In still another embodiment, the cis-isomer is present in an amount of greater than about 95 percent, and more preferably greater than about 96 percent, of the total polybutadiene content.

Examples of desirable polybutadiene rubbers include BUNA®CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. In addition, the base rubber may be mixed with other elastomers known in the art such as natural rubber, polyisoprene rubber and/or styrene-butadiene rubber in order to modify the properties of the composition.

Crosslinking Agent(s)

Crosslinkers are generally included in the core formulation to crosslink a portion of the chains of polymers in the resilient polymer component. For example, the desired compression may be obtained by adjusting the amount of crosslinking, which may be achieved by altering the type and amount of crosslinking agent, a method well-known to those of ordinary skill in the art. The crosslinking agent(s) is preferably contained in pellet form with at least one carrier/processing aid to reduce dust handling problems and other safety issues and reduce mixer build up when mixing the compositions of the invention. In addition, the processing aid increases dispersion of the crosslinking agent.

In one embodiment, the crosslinker is present in an amount of about 10 parts per hundred to about 50 parts per hundred based on 100 parts base rubber. As used herein, the term parts per hundred (pph) is defined as the number of parts by weight of a particular component present in a mixture, relative to 100 parts by weight of the total polymer component. Mathematically, this can be expressed as the weight of an ingredient divided by the total weight of the polymer, multiplied by a factor of 100. In another embodiment, about 20 pph to about 40 pph of the crosslinker is present in the composition. In still another embodiment, the crosslinker is present in the composition in an amount of about 25 pph to about 35 pph.

Suitable crosslinking agents include one or more metallic salts of unsaturated fatty acids having 3 to 8 carbon atoms, such as acrylic or methacrylic acid, or monocarboxylic acids, such as zinc, calcium, or magnesium acrylate salts, and the like, and mixtures thereof. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate (ZDA), zinc methacrylate (ZMA), zinc dimethacrylate (ZDMA), and mixtures thereof.

In one embodiment, the crosslinking agent is zinc diacrylate, which is preferably present in a masterbatch, wherein the amount of the masterbatch is from about 25 pph to about 35 pph of the total composition. This embodiment is particularly applicable when an organosulfur compound is selected as the cis-to-trans catalyst, which will be discussed in more detail below.

Because certain crosslinkers have negative effects on the processing of rubber-based compositions and the resultant composition properties, the crosslinkers included in the compositions of the invention are preferably dispersed in a pellet or pastille of a processing aid according to the invention, referred to herein as a crosslinker masterbatch. As mentioned above, the incorporation of the crosslinker with a processing aid of the invention reduces dust handling problems and improves dispersion of the crosslinker within the base rubber formulation.

The processing aid may be any metallic salt of a fatty acid that acts as a dispersion aid and/or acid acceptor. The metallic salt of a fatty acid is preferably a metallic salt of an unsaturated fatty acid, wherein the metal is magnesium, calcium, zinc, aluminum, sodium, lithium, nickel, or mixtures thereof. In one embodiment, the fatty acid is oleic acid, stearic acid, or combinations thereof. In another embodiment, the metal is zinc. In yet another embodiment, suitable metallic salts of a fatty acids include zinc stearate, zinc oleate, or mixtures thereof. A non-limiting example of a suitable metallic salt of a fatty acid for use with the invention is Aktiplast®, which is commercially available from Rhein Chemie of Trenton, N.J. Aktiplast® products are mainly for natural rubber blend compounds and typically zinc salts of unsaturated fatty acids. One additional advantage of the Aktiplast® is that, when incorporated into a base rubber composition, it accelerates vulcanization.

In this aspect of the invention, the processing aid is preferably present in the compositions of the invention in an amount of about 15 pph or less. In one embodiment, the processing aid is present in the compositions of the invention in an amount of about 5 pph or greater. In another embodiment, about 10 pph to about 15 pph of processing aid is included in the compositions of the invention.

In addition, the processing aid may be a thermoplastic material, such as high styrene resin, trans-polyisoprene, or trans-polybutadiene. For example, the processing aid may include styrene-butadiene copolymers, aliphatic hydrocarbon resins, and mixtures thereof. Suitable commercially available high styrene resins include, but are not limited to, Andrez® 8000 A-E and Westco® HSR, manufactured by Western Reserve Chemical, Inc. of Stow, Ohio.

The crosslinker/processing aid pellet may be made in any manner that results in a crosslinker dispersed in a processing aid pellet. One suitable method includes blending the processing aid and crosslinker in a mixer heated to about 175° F. to about 250° F., preferably from about 200° F. to about 225° F. The resultant pellets preferably include about 50 percent to about 95 percent crosslinker by weight of the total pellet and about 50 percent to about 5 percent of the processing aid. In one embodiment, about 60 percent or greater of the pellet is crosslinker and 40 percent or less is the processing aid.

Another method of incorporating the crosslinker into a pellet form with the processing aid is to create a crosslinker masterbatch that is later incorporated into the rubber-based composition. For example, a crosslinker masterbatch according to the invention may include crosslinker, a small amount of base rubber, and a processing aid. In particular, the masterbatch preferably includes about 60 percent to about 90 percent crosslinker, about 10 percent to about 30 percent base rubber, and about 1 percent to about 10 percent processing aid. In one embodiment, the masterbatch includes about 75 percent to about 85 percent crosslinker, about 10 percent to about 25 percent base rubber, and about 1 percent to about 5 percent processing aid. For example, a masterbatch according to the invention may include about 80 percent crosslinker, about 17 percent base rubber, and about 3 percent processing aid. This masterbatch formulation is particularly useful with zinc diacrylate as the crosslinker, polybutadiene as the base rubber, and at least one of the metal salts of fatty acids or thermoplastic processing aids discussed above.

In addition, the crosslinker may include a processing aid before being incorporated into the masterbatch. In one embodiment, the weight percentage of the crosslinker with regard to the masterbatch includes an predetermined amount of crosslinker and processing aid. For instance, the 80 percent crosslinker to be included in the masterbatch formulation may include about 90 percent to about 99 percent zinc diacrylate and about 10 percent to about 1 percent of a metal salt of a fatty acid. The metal salt of a fatty acid is preferably zinc stearate in this aspect of the invention.

After the masterbatch formulation is made, it is mixed with the base rubber, free radical initiator and, optionally, cis-to-trans catalyst and/or filler(s).

Velocity Improving Pastilles

The compositions of the invention may also include a velocity improving pastille, i.e., a pastille including a chemical peptizer and a physical peptizer. The chemical pastille is preferably a sulfur compound and the physical peptizer, i.e., the processing aid, is preferably a metal salt of an unsaturated fatty acid. As above, the processing aid will aid in dispersion of the velocity improver, and also act as an acid acceptor.

The sulfur compound may be a halogenated organosulfur compounds including, but not limited to those having the following general formula:

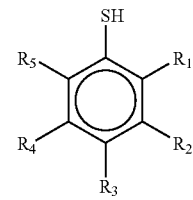

where $R_1$–$R_5$ can be $C_1$–$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their metal salts.

For example, the halogenated organosulfur compound may be pentachlorothiophenol, which is commercially available in neat form (commercially available from eChinachem of San Francisco, Calif.) or under the tradename STRUKTOL® A-95, a clay-based carrier containing the sulfur compound pentachlorothiophenol loaded at 45 percent (commercially available from Struktol Company of America of Stow, Ohio). In one embodiment, the halogenated organosulfur compound is the zinc salt of pentachlorothiophenol (ZnPCTP), which is also commercially available from eChinachem of San Francisco, Calif.

In another embodiment, the velocity improver may include diphenyl disulfide; 4,4'-ditolyl disulfide; dibenzamino disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphtyl)disulfide; 2,2'-bis(1-acetylnaphthyl)disulfide; and the like; or a mixture thereof. In one embodiment, the organosulfur components include diphenyl disulfide, 4,4'-ditolyl disulfide, or a mixture thereof. Dibenzaminodisulfide is particularly useful as a sulfur compound according to this embodiment.

The chemical peptizer is preferably present in an amount of about 60 percent to about 90 percent by weight of the pastille composition. In one embodiment, the pastille composition includes about 65 percent to about 80 percent by weight chemical peptizer, more preferably about 70 percent to about 80 percent. In another embodiment, the chemical peptizer is present in the pastille composition in an amount of about 75 percent.

The processing aid may be any metal salt of a fatty acid that acts as an acid acceptor and aids in dispersion of the sulfur compound. In one embodiment, the fatty acid is oleic acid, stearic acid, or combinations thereof. In another embodiment, the metal may be magnesium, calcium, zinc, aluminum, sodium, lithium, or nickel. In still another embodiment, the metal is zinc. For example, suitable metallic salts of fatty acids include zinc stearate, zinc oleate, or mixtures thereof. The fatty acid salts are preferably included in an amount of about 10 percent to about 15 percent by weight of the pastille composition. In one embodiment, the physical peptizer may be present in an amount of about 11 percent to about 14 percent by weight of the pastille composition, preferably about 11 percent to about 13 percent. For example, the pastille composition may include about 12 percent by weight fatty acid salt.

The pastille may also include a base rubber, such as polybutadiene. When included, the base rubber may be present in an amount of about 5 percent to about 30 percent by weight of the pastille composition. In one embodiment, the pastille composition includes about 10 percent to about 25 percent by weight base rubber, more preferably about 10 percent to about 20 percent. In another embodiment, the base rubber is present in the pastille composition in an amount of about 12 percent to about 15 percent by weight of the pastille composition. For example, the pastille composition may include about 13 percent base rubber.

The pastille may be made in any manner that results in a blend of the sulfur compounds and processing aids discussed above. One suitable method includes blending the processing aid and crosslinker in a mixer heated to about 175° F. to about 250° F., preferably from about 200° F. to about 225° F. The resultant pellets preferably include about 50 percent to about 95 percent sulfur compound and about 50 percent to about 5 percent of the processing aid. In one embodiment, the velocity improving pastille includes about 50 percent to about 95 percent ZnPCTP and about 50 percent to about 5 percent zinc stearate.

Free Radical Source(s)

A free-radical source, or free-radical initiator, is used to promote crosslinking between the crosslinker and the base rubber. Thus, the free radical source is preferably present in an amount sufficient to promote crosslinking.

In one embodiment, about 0.1 pph or greater of the free radical source, based on 100 part of the base rubber, is present in the composition. In another embodiment, the free radical source is present in an amount of about 0.1 pph to about 15 pph. In still another embodiment, the free radical source is present in an amount of about 0.2 pph to about 5 pph, preferably about 0.25 pph to about 2.5 pph. In yet another embodiment, the free radical source is present in an amount of about 0.5 pph to about 2 pph. In still another embodiment, the amount of free radical source is about 1 pph or less, preferably about 0.9 pph or less.

The free-radical source is typically a peroxide, and preferably an organic peroxide, which decomposes during the cure cycle. Suitable free-radical sources include organic peroxide compounds, such as di-t-amyl peroxide, di(2-t-butyl-peroxyisopropyl)benzene peroxide or ,-bis(t-butylperoxy) diisopropylbenzene, 1,1-bis(t-butylperoxy)-3,3,5-trimethylcyclohexane or 1,1-di(t-butylperoxy)3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof.

Other examples include, but are not limited to, VAROX® 231XL and Varox® DCP-R, commercially available from Elf Atochem of Philadelphia, Pa.; PERKODOX® BC, PERKODOX® 14, and TRIGONOX® 265, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98 percent active and has an active oxygen content of 5.8 percent, whereas PERKODOX® DCP-70 is 70 percent active and has an active oxygen content of 4.18 percent.

If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent 4 pph of a concentrate peroxide that is 50 percent active (i.e., 2 divided by 0.5=4).

The free radical source may alternatively or additionally be one or more of an electron beam, UV or gamma radiation, x-rays, or any other high energy radiation source capable of generating free radicals. It should be further understood that heat often facilitates initiation of the generation of free radicals.

Cis-to-Trans Catalyst

The compositions of the invention may also includes at least one cis-to-trans catalyst to at least partially convert the cis-isomers in the base rubber to trans-isomers. When included, the cis-to-trans catalyst is preferably contained in pellet form with at least one of the novel carriers/processing aids discussed above with respect to the crosslinker pellet and/or masterbatch.

Suitable cis-to-trans catalysts, and methods of incorporating the catalysts into the present formulations, are disclosed in U.S. Patent Publication No. 2003/0119989, which is incorporated by reference in its entirety herein. In particular, a high molecular weight cis-1,4-polybutadiene is converted to increase the percentage of trans-isomer content at any point in the golf ball or portion thereof, preferably to increase the percentage throughout substantially all of the golf ball or portion thereof, during the molding cycle.

Without being bound by any particular theory, it is believed that the cis-to-trans catalyst component, in conjunction with the free radical source, acts to convert a percentage of the polybutadiene polymer component from the cis- to the trans-conformation. Thus, formulations requiring cis-to-trans conversion require the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof.

As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component, a Group VIA component, an inorganic sulfide, or a combination thereof. As used herein when referring to the invention, the term "organosulfur compound(s)" or "organosulfur component(s)," refers to any compound containing carbon, hydrogen, and sulfur. As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

The cis-to-trans catalyst is typically present in an amount sufficient to produce the reaction product so as to increase the trans-polybutadiene isomer content to contain from about 5 percent to 70 percent trans-isomer polybutadiene based on the total resilient polymer component. Therefore, the cis-to-trans catalyst is preferably present in an amount from about 0.1 pph to about 15 pph based on 100 parts base rubber. In one embodiment, the cis-to-trans catalyst is present in an amount from about 0.1 pph to about 10 pph of the total resilient polymer component, preferably about 0.1 pph to about 6 pph, more preferably about 0.1 pph to about 4 pph, and even more preferably about 0.1 pph to about 3 pph. In another embodiment, the cis-to-trans catalyst is present in an amount of about 3 pph or less, preferably about 2.5 pph or less.

The cis-to-trans catalyst may also be incorporated into a pellet or pastille of a processing aid, similar to the crosslinker/processing aid pellets discussed above. When the cis-to-trans catalyst is incorporated in pellet form with the processing aid, dust handling problems are reduced, and the processing aid allows the cis-to-catalyst to better disperse within the base rubber composition. In one embodiment, the processing aid is a metal salt of a fatty acid.

The cis-to-trans catalyst/processing aid pellet may be made in any manner that results in adequate dispersion of the cis-to-trans catalyst in the processing aid. One suitable method includes blending the processing aid and cis-to-trans catalyst in a mixer heated to about 175° F. to about 250° F., preferably from about 200° F. to about 225° F. The resultant pellets preferably include about 50 percent to about 95 percent catalyst by weight of the total pellet and about 50 percent to about 5 percent of the processing. In one embodiment, about 60 percent or greater of the pellet is catalyst and 40 percent or less is the processing aid. In this aspect of the invention, the processing aid is preferably present in the compositions of the invention in an amount of about 15 pph or less. In one embodiment, the processing aid is present in the compositions of the invention in an amount of about 5 pph or greater. In another embodiment, about 10 pph to about 15 pph of processing aid is included in the compositions of the invention.

When an organosulfur cis-to-trans catalyst is used with the present invention, it is preferably present in an amount sufficient to produce the reaction product so as to contain at least about 10 percent trans-isomer at any location, preferably greater than about 15 percent trans-isomer polybutadiene at any location, and even more preferably about 20 percent or greater trans-isomer. In one embodiment, the organosulfur cis-to-trans catalyst is present in an amount sufficient to produce the reaction product so as to contain at least about 25 percent trans-isomer at any location, more preferably at least about 30 percent, and even more preferably at least about 35 percent. Even greater amounts of the cis-to-trans catalyst may be used to produce even higher amounts of trans-isomer. For instance, the cis-to-trans catalyst may be present in an amount sufficient to produce the reaction product so as to contain at least about 38 percent trans-isomer at any location, more preferably at least about 40 percent, and even more preferably at least about 45 percent.

The reaction product may also contain a low amount of 1,2-polybutadiene (vinyl polybutadiene). In one embodiment, the vinyl content is less than about 7 percent. In another embodiment, less than about 4 percent vinyl isomer is present, more preferably less than about 2 percent.

In one embodiment, the organosulfur cis-to-trans catalyst is present in the reaction product in an amount from about 0.5 pph or greater. In another embodiment, the cis-to-trans catalyst including organosulfur cis-to-trans catalyst is present in the reaction product in an amount from about 0.6 pph or greater, preferably about 1.0 pph or greater, and more preferably about 2.0 pph or greater.

The organosulfur compounds or components contemplated for use with the present invention includes aromatic organosulfur components, such as aryl compounds. For example, the organosulfur components that may be used with the present invention include, but are not limited to, diphenyl disulfide; 4,4'-ditolyl disulfide; dibenzamino disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl) disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl)disulfide; 1,1'-bis(2-chloronaphthyl)disulfide; 2,2'-bis(1-cyanonaphtyl)disulfide; 2,2'-bis(1-acetylnaphthyl)disulfide; and the like; or a mixture thereof. In one embodiment, the organosulfur components include diphenyl disulfide, 4,4'-ditolyl disulfide, or a mixture thereof.

The organosulfur components may or may not contain metal, depending on the desired golf ball component formulation properties. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. When used, the metal-containing organosulfur cis-to-trans catalyst is preferably present in the reaction product in an amount from about 1.0 pph or greater, preferably about 2.0 pph or greater, more preferably about 2.5 pph or greater, and even more preferably about 3.0 pph or greater.

In one embodiment, the organosulfur component is substantially free of metal. As used herein, the term "substantially free of metal" means less than about 10 weight percent, preferably less than about 5 weight percent, more preferably less than about 3 weight percent, even more preferably less than about 1 weight percent, and most preferably less than about 0.01 weight percent. Suitable substituted or unsubstituted aromatic organic components that do not include sulfur or a metal include, but are not limited to, diphenyl acetylene, azobenzene, or a mixture thereof. The aromatic organic group preferably ranges in size from $C_6$ to $C_{20}$, and more preferably from $C_6$ to $C_{10}$.

In another embodiment, organosulfur component is a halogenated organosulfur compound such as those listed above with respect to the velocity improving pastilles. When used, the halogenated organosulfur compounds of the present invention are preferably present in an amount greater than about 1 pph, more preferably between about 2 pph and about 5 pph, and most preferably between about 2.2 pph and about 4 pph.

As briefly mentioned above, the cis-to-trans catalyst may also include a Group VIA component. As used herein, the terms "Group VIA component" or "Group VIA element" refer to a component that includes a sulfur component, selenium, tellurium, or a combination thereof. Elemental sulfur and polymeric sulfur are commercially available from, e.g., Elastochem, Inc. of Chardon, Ohio. Suitable sulfur catalyst compounds include, but are not limited to, PB(RM-S)-80 elemental sulfur and PB(CRST)-65 polymeric sulfur, each of which is available from Elastochem, Inc. Suitable tellurium and selenium catalysts are available under the tradenames TELLOY and VANDEX, respectively, each of which are commercially available from RT Vanderbilt of Norwalk, Conn.

When used, the cis-to-trans catalyst including a Group VIA component may is preferably present in the reaction product in an amount from about 0.25 pph or greater, preferably about 0.5 pph or greater, and more preferably about 1.0 pph or greater.

In addition, inorganic sulfide components are contemplated as cis-to-trans catalysts. Suitable inorganic sulfide components for use with the present invention include, but are not limited to titanium sulfide, manganese sulfide, and sulfide analogs of iron, calcium, cobalt, molybdenum, tungsten, copper, selenium, yttrium, zinc, tin, and bismuth.

A cis-to-trans catalyst including an inorganic sulfide component is preferably present in an amount of about 0.5 pph or greater, preferably about 0.75 pph or greater, and more preferably about 1.0 pph or greater.

When a reaction product includes a blend of cis-to-trans catalysts including an organosulfur component and an inorganic sulfide component, the organosulfur component is preferably present in an amount from about 0.5 pph or greater, preferably 1.0 pph or greater, and more preferably about 1.5 pph or greater and the inorganic sulfide component is preferably present in an amount from about 0.5 pph or greater, preferably 0.75 pph or greater, and more preferably about 1.0 pph or greater.

Furthermore, a substituted or unsubstituted aromatic organic compound may also be included in the cis-to-trans catalyst. In one embodiment, the aromatic organic compound is substantially free of metal. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium.

It should be understood by those of ordinary skill in the art that the presence of certain cis-to-trans catalysts according to the invention may require a larger amount of free-radical source, such as the amounts described herein, compared to conventional cross-linking reactions.

In one embodiment, the ratio of the free radical source to the cis-to-trans catalyst is about 10 or less, preferably about 6 or less, more preferably about 4 or less, and even more preferably about 2 or less. In another embodiment, the ratio of the free radical source to the cis-to-trans catalyst is about 1 or less, preferably about 0.5 or less, and more preferably about 0.4 or less. In yet another embodiment, the free radical source—cis-to-trans catalyst ratio is greater than 1, preferably about 1.5 or greater, and more preferably about 1.75 or greater.

Methods of converting the cis-isomer of the base rubber to trans-isomer during a molding cycle are provided in U.S. Patent Publication No. 2003/0119989. For example, the base rubber, free-radical initiator, additional polymers, filler(s), and any other materials used in forming the core may be combined to form a mixture by any type of mixing known to one of ordinary skill in the art. Suitable types of mixing include single pass and multi-pass mixing, and the like. The crosslinking agent, and any other optional additives used to modify the characteristics of the golf ball core may similarly be combined by any type of mixing, however, a single-pass mixing process where ingredients are added sequentially is preferred, as this type of mixing tends to increase efficiency and reduce costs for the process.

In one embodiment, the mixing cycle is a single step where base rubber, cis-to-trans catalyst, filler, crosslinking agent, and peroxide are added sequentially. Suitable mixing equipment is well known to those of ordinary skill in the art, and such equipment may include a Banbury mixer, a two-roll mill, or a twin screw extruder. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

Filler(s)

Fillers may be added to the compositions of the present invention and typically include processing aids or compounds to affect rheological and mixing properties, the specific gravity (i.e., density-adjusting fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

In one embodiment, the composition includes a density-adjusting filler. Polymeric, ceramic, metal, or glass microspheres, or combinations thereof, may be used to adjust the density or other properties of a given layer, and such microspheres may be solid or hollow, and filled or unfilled. In one embodiment, the compositions of the invention include about 0.05 pph to about 1 pph of a density-adjusting filler. In another embodiment, about 0.1 pph to about 0.3 pph of density-adjusting filler is included in the compositions of the invention. In still another embodiment, the density-adjusting filler is present in an amount of about 0.1 pph to about 0.2 pph based on 100 parts of base rubber.

The amount of density-adjusting filler to be included in the compositions of the invention may also be determined by the desired specific gravity of the golf ball component to be formed. For example, the composition may include a density-adjusting filler present in an amount sufficient to achieve a golf ball component specific gravity of about 1 or greater. In one embodiment, the filler is present in an amount sufficient to adjust the specific gravity of the golf ball component to about 1.1 or greater. In another embodiment, the filler is present in an amount sufficient to adjust the specific gravity of the component to about 1.13 or greater.

Accelerator(s)

When elemental sulfur or polymeric sulfur is included in the cis-to-trans catalyst, an accelerator may be used to improve the performance of the cis-to-trans catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

Antioxidant

Typically, antioxidants are included in conventional rubber-based golf ball component compositions because antioxidants are included in the materials supplied by manufacturers of compounds used therein. Without being bound to any particular theory, higher amounts of antioxidant in the reaction product may result in less trans-isomer content because the antioxidants consume at least a portion of the free radical source. For example, a polybutadiene reaction product with 0.5 pph of antioxidant cured at 335° F. for 11 minutes results in about 15 percent trans-isomer content at an exterior surface of the center and about 13.4 percent at an interior location after the conversion reaction. In contrast, the same polybutadiene reaction product substantially free of antioxidants results in about 32 percent trans-isomer content at an exterior surface and about 21.4 percent at an interior location after the conversion reaction.

Thus, even with high amounts of the free radical source in the reaction product described previously, such as for example about 3 pph, an amount of antioxidant greater than about 0.3 pph may significantly reduce the effective amount of free radicals that are actually available to assist in a cis-to-trans conversion.

One way to ensure sufficient amounts of free radicals are provided for the conversion is to increase the initial levels of free radicals present in the composition so that sufficient amounts of free radicals remain after interaction with antioxidants in the composition. Thus, the initial amount of free radicals provided in the composition may be increased by at least about 10 percent, and more preferably are increased by at least about 25 percent so that the effective amount of remaining free radicals sufficient to adequately provide the desired cis-to-trans conversion. Depending on the amount of antioxidant present in the composition, the initial amount of free radicals may be increased by at least 50 percent, 100 percent, or an even greater amount as needed. As discussed below, selection of the amount of free radicals in the composition may be determined based on a desired ratio of free radicals to antioxidant.

Another approach is to reduce the levels of or completely eliminate antioxidants in the composition. For instance, the reaction product of the present invention may be substantially free of antioxidants, thereby achieving greater utilization of the free radicals toward the cis-to-trans conversion. As used herein, the term "substantially free" generally means that the polybutadiene reaction product includes less than about 0.3 pph of antioxidant, preferably less than about 0.1 pph of antioxidant, more preferably less than about 0.05 pph of antioxidant, and most preferably about 0.01 pph or less antioxidant.

In one embodiment, the ratio of the free radical source to antioxidant is greater than about 10, preferably greater than about 25, and more preferably greater than about 50. In another embodiment, the free radical source-antioxidant ratio is about 100 or greater, preferably about 200 or greater, more preferably 250 or greater, and even more preferably about 300 or greater.

If the compositions of the invention are substantially free of antioxidants, the amount of the free radical source may be about 3 pph or less, preferably about 2.5 pph or less, and more preferably about 2.4 pph or less. In one embodiment, the amount of the free radical source in the composition is about 2 pph or less, preferably about 1.5 pph or less, and more preferably about 1 pph or less. When the composition contains about 0.05 pph or greater antioxidant, however, the free radical source is preferably present in an amount of about 0.5 pph or greater. In one embodiment, when the composition contains about 0.1 pph or greater antioxidant, the free radical source is present in an amount of about 2 pph or greater. In another embodiment, the free radical source is present in an amount of about 2.5 pph or greater when the antioxidant is present in an amount of about 0.1 pph or greater.

Composition Properties

The compositions of the invention preferably produce a golf ball components having an Atti compression of about 70 or less. As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball component. Compression values are dependent on the diameter of the article being measured. In another embodiment, the compression of the component is about 20 or greater. As used herein, the term "about" is used in connection with one or more numbers or numerical ranges, should be understood to refer to all such numbers, including all numbers in a range. In still another embodiment, the compression of the component is about 25 to about 65. In yet another embodiment, the component compression is about 30 to about 50.

In an alternative embodiment, the component may have a compression of less than about 20, more preferably less than about 10, and most preferably around 0. As known to one of ordinary skill in the art, however, the compression of the component generated according to the present invention may be below the measurement of the Atti Compression Gauge.

Moreover, the composition preferably has a flexural modulus of from about 500 psi to about 300,000 psi, preferably from about 1,000 to about 250,000, and more preferably from about 2,000 to about 200,000 psi.

Golf Ball Construction

The rubber-based compositions of the present invention may be used with any type of ball construction. For example, one-piece, two-piece, three-piece, and four-piece golf ball designs are contemplated by the present invention. In addition, golf balls having double cores, intermediate layer(s), and/or double covers are also useful with the present invention. As known to those of ordinary skill in the art, the type of golf ball constructed, i.e., double core, double cover, and the like, depends on the type of performance desired of the ball. As used herein, the term "layer" includes any generally spherical portion of a golf ball, i.e., a golf ball core or center, an intermediate layer, and/or a golf ball cover. As used herein, the term "inner layer" refers to any golf ball layer beneath the outermost structural layer of the golf ball. As used herein, "structural layer" does not include a coating layer, top coat, paint layer, or the like. As used herein, the term "multilayer" means at least two layers.

Figure 2:
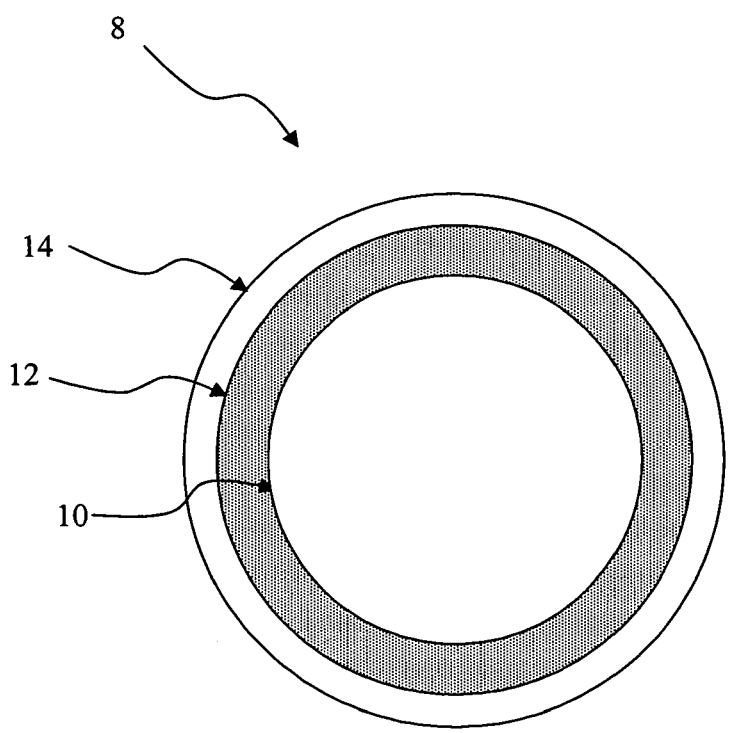
FIG. 2 is a cross-sectional view of a multi-component golf ball, wherein at least a portion of the golf ball is formed from the compositions of the invention.
Figure 3:
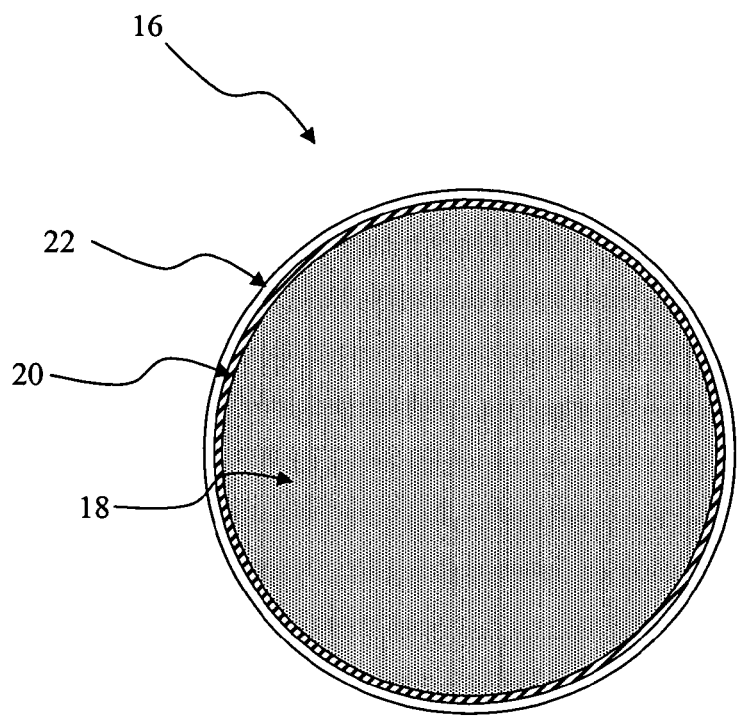
FIG. 3 is a cross-sectional view of a multi-component golf ball including a large core, an intermediate layer, and a thin outer cover layer disposed thereon, wherein at least a portion of the golf ball is formed from the compositions of the invention.
Figure 4:
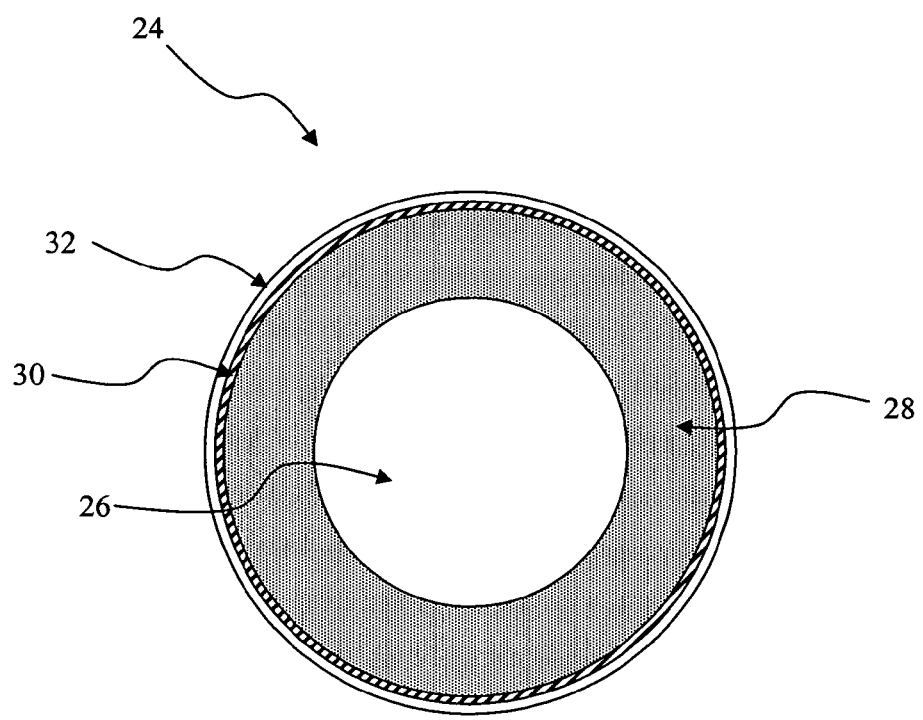
FIG. 4 is a cross-sectional view of a multi-component golf ball including a core, an outer core layer, a thin inner cover layer, and a thin outer cover layer disposed thereon, wherein at least a portion of the golf ball is formed from the compositions of the invention.

In one embodiment, a golf ball 2 according to the invention (as shown in FIG. 1) includes a core 4 and a cover 6, wherein the at least one of core 4 and cover 6 incorporates at least one layer including the rubber-based composition of the invention. In another embodiment, the core 4 is formed of the rubber-based composition of the invention. Similarly, FIG. 2 illustrates a golf ball according to the invention incorporating an intermediate layer. Golf ball 10 includes a core 12, a cover 16, and an intermediate layer 14 disposed between the core 12 and cover 16. Any of the core 12, intermediate layer 14, or cover 16 may incorporate at least one layer that includes the rubber-based composition of the invention. FIG. 3 illustrates a multilayer golf ball 16 according to the invention including a large core 18, an outer core layer, intermediate layer, or inner cover layer 20, and an outer cover layer 22. Any of the core 18, outer core layer, intermediate layer, or inner cover layer 20, and outer cover layer 22 may include the rubber-based compositions of the invention. FIG. 4 shows a four-piece golf ball 24 according to the invention including a core 26, an outer core layer or intermediate layer 28, an inner cover layer 30, and an outer cover layer 32. Any of the core 26, outer core layer or intermediate layer 28, inner cover layer 30, and outer cover layer 32 may include the rubber-based compositions of the invention.

Other non-limiting examples of suitable types of ball constructions that may be used with the present invention include those described in U.S. Pat. Nos. 6,056,842, 5,688, 191, 5,713,801, 5,803,831, 5,885,172, 5,919,100, 5,965,669, 5,981,654, 5,981,658, and 6,149,535, as well as in Publication Nos. U.S. 2001/0009310 A1, U.S. 2002/0025862, U.S. 2002/0028885, U.S. 2002/0151380. The entire disclosures of these patents and published patent applications are incorporated by reference herein. For example, in Publication No. U.S. 2002/015380, a golf ball having three or more cover layers is disclosed, of which any of the layers of the ball may be formed using the rubber-based compositions of the invention. In addition, the compositions of the invention are contemplated for use in layers of the gradated hardness multilayer golf balls disclosed in U.S. Patent Publication No. 2001/0005699, which is incorporated by reference herein in its entirety.

As discussed, the golf balls of the invention include at least one structural layer that includes the rubber-based compositions of the invention. In addition, as discussed below, the golf balls of the invention may include core layers, intermediate layers, or cover layers formed from materials known to those of skill in the art. These examples are not exhaustive, as skilled artisans would be aware that a variety of materials might be used to produce a golf ball of the invention with desired performance properties.

Core Layer(s)

The cores of the golf balls formed according to the invention may be solid, semi-solid, hollow, fluid-filled, or powder filled, but are preferably solid and formed with the compositions of the invention. As used herein, the term "core" means the innermost portion of a golf ball, and may include one or more layers. For example, U.S. Pat. Nos. 6,180,040 and 6,180,722 disclose methods of preparing dual core golf balls. The entire disclosures of these patents are incorporated by reference herein. The term "semi-solid" as used herein refers to a paste, a gel, or the like. The cores of the golf balls of the invention may be spherical, cubical, pyramid-shaped, geodesic, or any three-dimensional, symmetrical shape.

While the cores of the invention may be formed with the rubber-based compositions of the invention, conventional materials may also be used to form the cores. Suitable core materials include, but are not limited to, thermoset materials, such as rubber, styrene butadiene, polybutadiene, isoprene, polyisoprene, trans-isoprene, and polyurethane, and thermoplastic materials, such as conventional ionomer resins, polyamides, polyesters, and polyurethane. In one embodiment, at least one layer of the core is formed from a polybutadiene reaction product, such as the reaction products disclosed in U.S. Patent Publication No. 2003/0119989, the entire disclosure of which is incorporated by reference herein.

Additional materials may be included in the core layer compositions outlined above. For example, catalysts, coloring agents, optical brighteners, crosslinking agents, whitening agents such as $TiO_2$ and $ZnO$, UV absorbers, hindered amine light stabilizers, defoaming agents, processing aids, surfactants, and other conventional additives may be added to the core layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the core layer compositions. One of ordinary skill in the art should be aware of the requisite amount for each type of additive to realize the benefits of that particular additive.

The core may also include one or more wound layers (surrounding a fluid or solid center) including at least one tensioned elastomeric material wound about the center. In one embodiment, the tensioned elastomeric material includes natural or synthetic elastomers or blends thereof. The synthetic elastomer preferably includes LYCRA. In another embodiment, the tensioned elastomeric material incorporates a polybutadiene reaction product as disclosed in co-pending U.S. Patent Publication No. 2003/0119989. In yet another embodiment, the tensioned elastomeric material may also be formed from conventional polyisoprene. In still another embodiment, a polyurea composition (as disclosed in co-pending U.S. Patent Publication No. 2003/0096936, which is incorporated by reference in its entirety by reference herein) is used to form the tensioned elastomeric material. In another embodiment, solvent spun polyethers urea, as disclosed in U.S. Pat. No. 6,149,535, which is incorporated in its entirety by reference herein, is used to form the tensioned elastomeric material in an effort to achieve a smaller cross-sectional area with multiple strands.

The tensioned elastomeric layer may also be a high tensile filament having a tensile modulus of about 10,000 kpsi or greater, as disclosed in co-pending U.S. Patent Publication Nos. 2002/0160859 and 2002/0160862, the entire disclosures of which are incorporated by reference herein.

In another aspect of the invention, the golf balls of the invention include a thin, highly filled core layer, such as the ones disclosed in U.S. Pat. No. 6,494,795, which is incorporated by reference herein in its entirety. A thin, highly filled core layer allows the weight or mass of the golf ball to be allocated radially relative to the centroid, thereby dictating the moment of inertia of the ball. When the weight is allocated radially toward the centroid, the moment of inertia is decreased, and when the weight is allocated outward away from the centroid, the moment of inertia is increased.

Intermediate Layer(s)

As used herein, "intermediate layer" includes any layer between the innermost layer of the golf ball and the outermost layer of the golf ball. Therefore, intermediate layers may also be referred to as outer core layers, inner cover layers, and the like. When the golf ball of the present invention includes an intermediate layer, this layer may be formed from the rubber-based compositions of the invention.

The intermediate layer may also be formed of conventional materials known to those of ordinary skill in the art, including various thermoset and thermoplastic materials, as well as blends thereof. For example, the intermediate layers of the golf ball of the invention may be formed with the compositions of the invention. The intermediate layer may likewise be formed, at least in part, from one or more homopolymeric or copolymeric materials, such as vinyl resins, polyolefins, polyurethanes, polyureas, polyamides, acrylic resins, olefinic thermoplastic rubbers, block copolymers of styrene and butadiene, isoprene or ethylene-butylene rubber, copoly(ether-amide), polyphenylene oxide resins, thermoplastic polyesters, ethylene, propylene, 1-butene or 1-hexene based homopolymers or copolymers, and the like.

The intermediate layer may also be formed from highly neutralized polymers such as those disclosed U.S. Patent Publication No. 2001/0018375 and 2001/0019971, which are incorporated herein in their entirety by express reference thereto; grafted and non-grafted metallocene catalyzed polyolefins and polyamides, polyamide/ionomer blends, and polyamide/nonionomer blends, such as those disclosed in U.S. Patent Publication No. 2003/0078348, which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

Additional materials may be included in the intermediate layer compositions outlined above. For example, catalysts, coloring agents, optical brighteners, crosslinking agents, whitening agents such as $TiO_2$ and $ZnO$, UV absorbers, hindered amine light stabilizers, defoaming agents, processing aids, surfactants, and other conventional additives may be added to the intermediate layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

The intermediate layer may also be formed of a binding material and an interstitial material distributed in the binding material, as discussed in U.S. Patent Publication No. 2003/0125134, the entire disclosure of which is incorporated by reference herein. In addition, at least one intermediate layer may also be a moisture barrier layer, such as the ones described in U.S. Pat. No. 5,820,488, which is incorporated in its entirety by reference herein. The intermediate layer may also be formed from any of the polyurethane, polyurea, and polybutadiene materials discussed co-pending U.S. Patent Publication No. 2003/0096936.

Cover Layer(s)

The cover provides the interface between the ball and a club. As used herein, the term "cover" means the outermost portion of a golf ball. A cover typically includes at least one layer and may contain indentations such as dimples and/or ridges. Paints and/or laminates are typically disposed about the cover to protect the golf ball during use thereof. The cover may include a plurality of layers, e.g., an inner cover layer disposed about a golf ball center and an outer cover layer formed thereon.

Inner and/or outer cover layers may be formed of the compositions of the invention. Alternatively, both the inner and/or outer cover layers of golf balls of the present invention may be formed of the highly neutralized ionomer compositions, other cover materials known to those of skill in the art, or blends thereof. For example, the cover may be formed of polyurea, polyurethane, or mixtures thereof, as disclosed in co-pending U.S. Patent Publication No. 2003/0096936 and U.S. patent application Ser. No. 10/339,603, filed Jan. 10, 2003, entitled "Polyurethane Compositions for Golf Balls." The entire disclosures of these applications are incorporated by reference herein.

In addition, cover layers may also be formed of one or more homopolymeric or copolymeric materials, such as vinyl resins, polyolefins, conventional polyurethanes and polyureas, such as the ones disclosed in U.S. Pat. Nos. 5,334,673, and 5,484,870, polyamides, acrylic resins and blends of these resins with poly vinyl chloride, elastomers, and the like, thermoplastic urethanes, olefinic thermplastic rubbers, block copolymers of styrene and butadiene, polyphenylene oxide resins or blends of polyphenylene oxide with high impact polystyrene, thermoplastic polyesters, ethylene, propylene, 1-butene or 1-hexane based homopolymers or copolymers including functional monomers, methyl acrylate, methyl methacrylate homopolymers and copolymers, low acid ionomers, high acid ionomers, alloys, and mixtures thereof. The cover may also be at least partially formed from a polybutadiene reaction product as disclosed in U.S. Patent Publication No. 2003/0119989.

Additional materials may be included in the cover layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the cover layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the cover layer compositions. Those of ordinary skill in the art should be aware of the requisite amount for each type of additive to realize the benefits of that particular additive.

In addition, while hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

As discussed above with respect to the core of the golf balls of the invention, the use of a thin, highly filled layer allows the weight or mass of the golf ball to be allocated radially relative to the centroid, thereby dictating the moment of inertia of the ball. This concept is translatable to the cover layers of a golf ball. Thus, the inner cover layer may be a thin, dense layer so as to form a high moment of inertia ball. In this aspect of the invention, the inner cover layer preferably has a specific gravity of greater than 1.2, more preferably more than 1.5, even more preferably more than 1.8, and most preferably more than 2.0. Suitable materials for the thin, dense layer include any material that meets the specific gravity stated above. For example, this thin, highly filled inner cover layer may be formed of the radiation-curable compositions of the invention, adjusting for the requisite specific gravity. Alternatively, the inner cover layer may be formed from epoxies, styrenated polyesters, polyurethanes or polyureas, liquid PBR's, silicones, silicate gels, agar gels, and the like.

Methods for Forming

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like.

A method of injection molding using a split vent pin can be found in co-pending U.S. Patent Publication No. 2002/0079615 Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the castable compositions, which also allows for a higher loading of catalyst (if used) into the system.

One skilled in the art would appreciate that the molding method used may be determined at least partially by the properties of the composition. For example, casting, RIM, or LIM may be preferred when the material is thermoset, whereas compression molding or injection molding may be preferred for thermoplastic compositions. Compression molding, however, may also be used for thermoset inner ball materials. For example, when cores are formed from a thermoset material, compression molding is a particularly suitable method of forming the core, whereas when the cores are formed of a thermoplastic material, the cores may be injection molded. In addition, the intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

In addition, when covers for the golf balls of the invention are formed of polyurea and/or polyurethane compositions, these materials may be applied over an inner ball using a variety of application techniques such as spraying, compression molding, dipping, spin coating, casting, or flow coating methods that are well known in the art. Examples of forming polyurea and polyurethane materials about an inner ball are disclosed in U.S. Pat. Nos. 5,733,428, 5,006,297, and 5,334,673, which are incorporated by reference in their entirety herein. In one embodiment, a combination of casting and compression molding can be used to form a polyurethane or polyurea composition over an inner ball. However, the method of forming covers according to the invention is not limited to the use of these techniques; other methods known to those skilled in the art may also be employed.

Any inner layer of the golf balls of the invention may be surface treated prior to cover formation to further increase the adhesion between the outer surface of the inner ball and the cover. In addition, the outermost cover of the golf balls of the invention may be surface treated prior to application of any coating layer. Such surface treatment may include mechanically or chemically abrading the outer surface of the subassembly. Additionally, the inner ball may be subjected to corona discharge, plasma treatment, and/or silane dipping prior to forming the cover around it. Other layers of the ball, e.g., the core, also may be surface treated. Examples of these and other surface treatment techniques can be found in U.S. Pat. No. 6,315,915, which is incorporated by reference in its entirety.

The methods discussed herein and other manufacturing methods for forming the golf ball components of the present invention are also disclosed in U.S. Pat. Nos. 6,207,784 and 5,484,870, the disclosures of which are incorporated herein by reference in their entirety.

Dimples

The golf balls of the invention are preferably designed with certain flight characteristics in mind. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, or a a tubular lattice pattern, such as the one disclosed in U.S. Pat. No. 6,290,615, the disclosures of which are incorporated herein in their entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated in its entirety by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer. In an alternative embodiment, the golf ball may have a non-planar parting line allowing for some of the plurality of pyramidal projections to be disposed about the equator.

Several additional non-limiting examples of dimple patterns with varying sizes of dimples are also provided in U.S. Pat. Nos. 6,358,161 and 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. Patent Publication No. 2003/0114255, which is incorporated in its entirety by reference herein, is contemplated for use with the golf balls of the present invention.

Golf Ball Post-Processing

The golf balls of the present invention may be painted, coated, or surface treated for further benefits. For example, a golf ball of the invention may be treated with a base resin paint composition or the cover composition may contain certain additives to achieve a desired color characteristic. In one embodiment, the golf ball cover composition contains a fluorescent whitening agent, e.g., a derivative of 7-triazinylamino-3-phenylcoumarin, to provide improved weather resistance and brightness. An example of such a fluorescent whitening agent is disclosed in U.S. Patent Publication No. 2002/0082358, which is incorporated by reference herein in its entirety.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. For example, the coating layer(s) may be applied to the golf ball cover by an in-mold coating process, such as described in U.S. Pat. No. 5,849,168, which is incorporated in its entirety by reference herein. The coating layer may have a thickness of about 0.004 inches or less, more preferably about 0.002 inches or less.

In addition, the golf balls of the invention may be painted or coated with an ultraviolet curable/treatable ink, by using the methods and materials disclosed in U.S. Pat. Nos. 6,500,495, 6,248,804, and 6,099,415, the entire disclosures of which are incorporated by reference herein.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. Patent Publication No. 20030106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. The thickness of the outer cover layer may be from about 0.005 inches to about 0.100 inches, preferably about 0.007 inches to about 0.035 inches. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

In another embodiment, the cover layer is harder than the intermediate layer. In this design, the ratio of Shore D hardness of the cover layer to the intermediate layer is about 1.33 or less, preferably from about 1.14 or less.

Compression

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 80, more preferably less than about 75. In another embodiment, the core compression is from about 40 to about 80, preferably from about 45 to about 75, and more preferably from about 50 to about 70. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range. For example, a golf ball of the invention may be designed to have an initial velocity of about 220 ft/s or greater, preferably about 225 ft/s or greater.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Spin Rate

As known to those of ordinary skill in the art, the spin rate of a golf ball will vary depending on the golf ball construction. In a multilayer ball, e.g., a core, an intermediate layer, and a cover, wherein the cover is formed from the compositions of the invention, the spin rate of the ball off a driver ("driver spin rate") may be 1500 rpm or greater. In one embodiment, the driver spin rate is about 2000 rpm to about 3500 rpm. In another embodiment, the driver spin rate is about 2200 rpm to about 3400 rpm. In still another embodiment, the driver spin rate may be less than about 1500 rpm.

Two-piece balls made according to the invention may also have driver spin rates of 1500 rpm and greater. In one embodiment, the driver spin rate is about 2000 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus of about 500 psi to about 500,000 psi according to ASTM D-6272-98. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravoty of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

While it is apparent that the invention disclosed herein is well calculated to fulfill the objects stated above, it will be appreciated that numerous modifications and embodiments may be devised by those skilled in the art. For example, while golf balls and golf ball components are used as examples for articles incorporating the compositions of the invention, other golf equipment may be formed from the compositions of the invention. In one embodiment, at least a portion of a golf shoe is formed from the composition of the invention. In another embodiment, the composition of the invention is used to form at least a portion of a golf club. Therefore, it is intended that the appended claims cover all such modifications and embodiments that fall within the true spirit and scope of the present invention.

EXAMPLES

The following non-limiting example is merely illustrative of the preferred embodiments of the present invention, and are not to be construed as limiting the invention, the scope of which is defined by the appended claims. Parts are by weight unless otherwise indicated.

Example 1

Cores Made According to the Invention

The cores of multilayer balls were formed by compression molding a blend of the batch formulation set forth in Table 1 below.

TABLE 1

Core Batch Formulation

| Material | | Parts Per Hundred (pph) | |
|---|---|---|---|
| | | Formula 1 | Formula 2 |
| Base Rubber | Buna CB23[1] | 100 pph | 100 |
| ZDA Masterbatch | Mixture of zinc diacrylate, polybutadiene, and processing aid | 30.0 | 35.0 |
| Activator | Zinc Oxide | 5.0 | 5.0 |
| Organic Peroxide Initiator | Trigonox 265[2] | 0.53 | 0.53 |

TABLE 1-continued

Core Batch Formulation

| Material | | Parts Per Hundred (pph) | |
|---|---|---|---|
| | | Formula 1 | Formula 2 |
| Density Adjusting Filler | Barium Sulfate | to 1.15 | to 1.15 |

[1]Commercially available from Bayer of Akron, OH.
[2]Available from Akzo Nobel of Chicago, IL.

Five ZDA masterbatches (Control and A–D) were used to make Formulations 1 and 2, which are provided in Table 2 below:

TABLE 2

ZDA Masterbatch Formulations

| Material | | Weight Percent | | | | |
|---|---|---|---|---|---|---|
| | | Control | A | B | C | D |
| | Buna CB23 | 17 | 17 | 17 | 17 | 17 |
| | SR-526[1] | 80 | 80 | 80 | 80 | 80 |
| Polyethylene Wax | Aflux PE-11[2] | 3 | | | | |
| Zinc Salt of Unsaturated Fatty Acids | Aktiplast PP[3] | | 3 | | | |
| High Styrene Resins | Andrez 8000 HSR[4] | | | 3 | | |
| | Westco HSR[5] | | | | 3 | |
| Balata | TP-251 | | | | | 3 |

[1]SR-526 contains 92 weight percent zinc diacrylate and 8 weight percent zinc stearate.
[2,3]Commercially available from Rhein Chemie of Trenton, New Jersey.
[4,5]Commercially available from Western Reserve Chemical, Inc. of Stow, OH.

Figure 5:
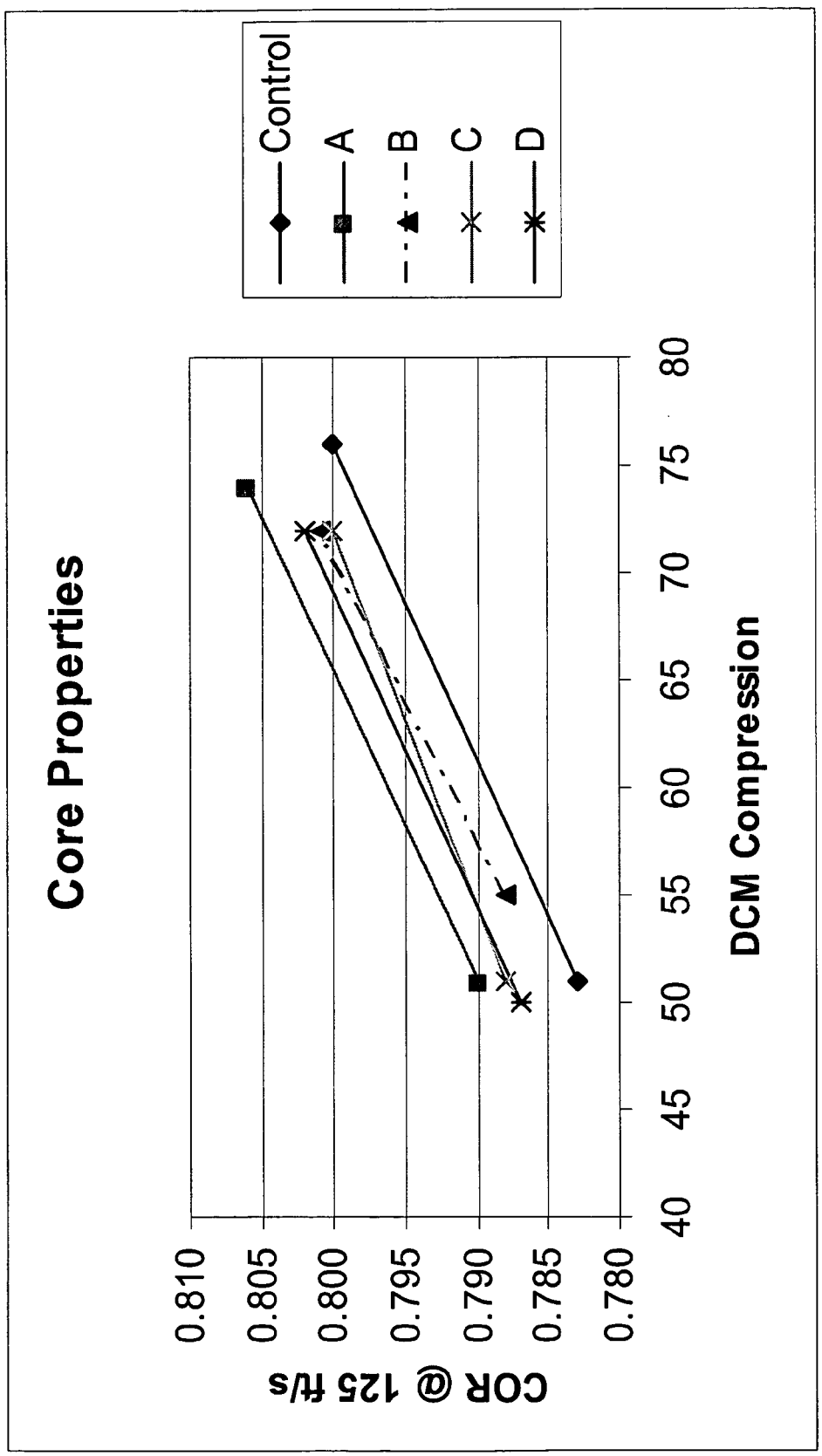
FIG. 5 is a graph depicting the relationship between compression and COR when using different processing aids in the zinc diacrylate masterbatch according to the invention.

As shown in FIG. 5 and tabulated below in Table 3, the use of a conventional polyethylene as a processing aid in a zinc diacrylate masterbatch results in a core with a lower COR as compared to similar core formulations using different processing aids. For example, the use of a zinc salt of an unsaturated fatty acid in the ZDA masterbatch results in a core COR about 0.006 to about 0.007 greater than that of a core formed with a ZDA masterbatch including polyethylene wax.

TABLE 3

Resultant Core Properties

| | Weight Percent | | | | | | | | | |
|---|---|---|---|---|---|---|---|---|---|---|
| | Control | | A | | B | | C | | D | |
| Properties | Formula #1 | Formula #2 | Formula #1 | Formula #2 | Formula #1 | Formula #2 | Formula #1 | Formula #2 | Formula #1 | Formula #2 |
| Compression | 51 | 76 | 51 | 74 | 55 | 72 | 51 | 72 | 50 | 72 |
| COR @ 125 ft/s | 0.783 | 0.800 | 0.790 | 0.806 | 0.788 | 0.801 | 0.788 | 0.800 | 0.787 | 0.802 |

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions of the present invention may be used in a variety of golf equipment, for example, golf shoes for sole applications, as well as in inserts for golf putters. Such modifications are also intended to fall within the scope of the appended claims.

What is claimed is:

1. A core composition for a golf ball comprising:
   a first base rubber;
   a crosslinker masterbatch comprising at least one crosslinker, a second base rubber, and at least one processing aid, wherein the processing aid is selected from the group consisting of high styrene resins, transpolyisoprene, transpolybutadiene, and mixtures thereof; and
   a free radical initiator.

2. The core composition of claim 1, wherein the at least one crosslinker comprises a blend of a crosslinking agent and a metal salt of a fatty acid.

3. The core composition of claim 1, wherein the crosslinker masterbatch is present in an amount of about 25 pph to about 35 pph of the total core composition.

4. The core composition of claim 1, wherein the second base rubber comprises polybutadiene.

5. The core composition of claim 1, wherein the crosslinker masterbatch comprises about 60 percent to about 90 percent crosslinker, about 10 percent to about 30 percent base rubber, and about 1 percent to about 10 percent processing aid.

6. The core composition of claim 5, wherein the crosslinker masterbatch comprises about 75 percent to about 85 percent crosslinker, about 10 percent to about 25 percent base rubber, and about 1 percent to about 5 percent processing aid.

7. The core composition of claim 6, wherein the crosslinker masterbatch comprises about 80 percent crosslinker, and about 17 percent base rubber, and 3 percent processing aid.

8. The core composition of claim 1, wherein the free radical initiator comprises a peroxide.

9. The core composition of claim 1, wherein the first base rubber and the second base rubber comprise polybutadiene, and wherein the crosslinker comprises zinc diacrylate, and wherein the processing aid comprises a high styrene resin.

10. The core composition of claim 9, wherein the high styrene resin is a styrene-butadiene copolymer.

11. The core composition of claim 1, wherein the processing aid is a styrene-buradiene copolymer.

12. The core composition of claim 1, wherein the composition further comprises at least one of a density-adjusting filler or an antioxidant.

13. A composition for golf balls comprising:
    a base rubber;
    a crosslinker pellet, wherein the pellet comprises at least one crosslinking agent and at least one processing aid comprising a high styrene resin, transpolyisoprene, transpolybutadiene, or a pixture thereof; and
    a free radical initiator.

14. The composition of claim 13, wherein the pellet comprises about 50 percent to about 95 percent of the at least one crosslinking agent and about 50 percent to about 5 percent of the at least one processing aid.

15. The composition of claim 13, wherein the pellet comprises about 60 percent or greater of the at least one crosslinking agent and about 40 percent or less of the at least one processing aid.

16. The composition of claim 13, wherein the free radical initiator is present in the composition in an amount of about 0.5 ph to about 2 pph.

17. The composition of claim 13, wherein the crosslinking agent is selected from the group consisting of zinc acrylate, zinc diacrylate, zinc methacrylate, zinc dimethacrylate, and mixtures thereof.

18. A method of preparing a composition for golf balls comprising the steps of:
    providing a crosslinking agent;
    providing a processing aid comprising a high styrene resin, transpolyisoprene, transpolybutadiene, or a mixture thereof;
    blending the crosslinking agent and the processing aid in a mixer at a temperature of about 175° F. to about 250° F. to form a pellet;
    providing a base rubber;
    mixing the base rubber and the pellet; and
    promoting crosslinking between the base rubber and the pellet with a free radical initiator.

19. The method of claim 18, wherein the crosslinking agent is selected from the group consisting of zinc acrylate, zinc diacrylate, zinc methacrylate, zinc dimethacrylate, and mixtures thereof.

20. The method of claim 18, wherein the processing aid comprises a styrene-butadiene copolymer.

21. The method of claim 18, wherein the free radical initiator comprises di-t-amyl peroxide, di(2-t-butyl-peroxyisopropyl)benzene peroxide or ,-bis(t-butylperoxy) diisopropylbenzene, 1,1-bis(t-butylperoxy)-3,3,5-trimethylcyclohexane or 1,1-di(t-butylperoxy) 3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, or mixtures thereof.

22. The method of claim 18, wherein the step of blending is performed at a temperature of about 200° F. to about 225° F.

23. The method of claim 18, wherein the step of blending further comprises blending about 50 percent to about 95 percent crosslinking agent with about 50 percent to about 5 percent processing aid.

* * * * *